United States Patent [19]

D'Elena et al.

[11] Patent Number: 5,842,203
[45] Date of Patent: Nov. 24, 1998

[54] METHOD AND SYSTEM FOR PERFORMING NON-BOOLEAN SEARCH QUERIES IN A GRAPHICAL USER INTERFACE

[75] Inventors: Daniel F. D'Elena, West Milford, N.J.; Anthony E. Martinez, Boca Raton, Fla.

[73] Assignee: International Business Machines Corporation, Armonk, N.Y.

[21] Appl. No.: 566,330

[22] Filed: Dec. 1, 1995

[51] Int. Cl.⁶ .................................................. G06F 17/30
[52] U.S. Cl. .................................. 707/4; 707/5; 345/968
[58] Field of Search .................................. 395/604, 605; 707/4, 5; 345/348, 349, 350, 352–354, 356, 357, 968

[56] References Cited

U.S. PATENT DOCUMENTS

| | | | |
|---|---|---|---|
| 4,868,733 | 9/1989 | Fujisawa et al. | 395/605 |
| 4,870,576 | 9/1989 | Tornetta | 395/201 |
| 4,939,689 | 7/1990 | Davis et al. | 395/613 |
| 5,167,011 | 11/1992 | Priest | 395/54 |
| 5,168,533 | 12/1992 | Kato et al. | 382/229 |
| 5,175,814 | 12/1992 | Anick et al. | 395/348 |
| 5,206,949 | 4/1993 | Cochran et al. | 395/604 |
| 5,237,678 | 8/1993 | Kuechler et al. | 395/605 |
| 5,241,671 | 8/1993 | Reed et al. | 395/615 |
| 5,251,294 | 10/1993 | Abelow | 395/777 |
| 5,265,065 | 11/1993 | Turtle | 395/604 |
| 5,278,980 | 1/1994 | Pedersen et al. | 395/604 |
| 5,388,196 | 2/1995 | Pajak et al. | 395/329 |
| 5,418,948 | 5/1995 | Turtle | 395/604 |
| 5,428,778 | 6/1995 | Brookes | 395/605 |
| 5,442,778 | 8/1995 | Pedersen et al. | 395/605 |
| 5,515,488 | 5/1996 | Hoppe et al. | 395/140 |
| 5,630,121 | 5/1997 | Braden-Harder et al. | 395/604 |
| 5,630,125 | 5/1997 | Zellweger | 395/614 |

OTHER PUBLICATIONS

Salton, G. et al., "Automatic Query Formulations in Information Retrieval," Journal of the American Society for Information Science, v. 34, n. 4, Jul. 1983, pp. 262–280.

*Primary Examiner*—Paul R. Lintz
*Assistant Examiner*—Maria N. Von Buhr
*Attorney, Agent, or Firm*—Mark S. Walker; Lisa B. Yociss; Andrew J. Dillon

[57] ABSTRACT

A data processing system that includes a data store, means for archiving files within the data store, and a graphical user interface is disclosed that uses a novel query system. The query system includes a domain scope control field, a narrowing search control funnel, a specific item search field, and a broadening search control funnel. The domain scope control field allows a user to perform a hierarchical search within a plurality of topics available in the domain control field. The search query generates a search cell. The narrowing search control allows a user to narrow the scope of the search cell. The specific item search field allows a user to identify specific key words to be searched within the search cell. The broadening search control allows a user to broaden the scope of the search cell.

14 Claims, 7 Drawing Sheets

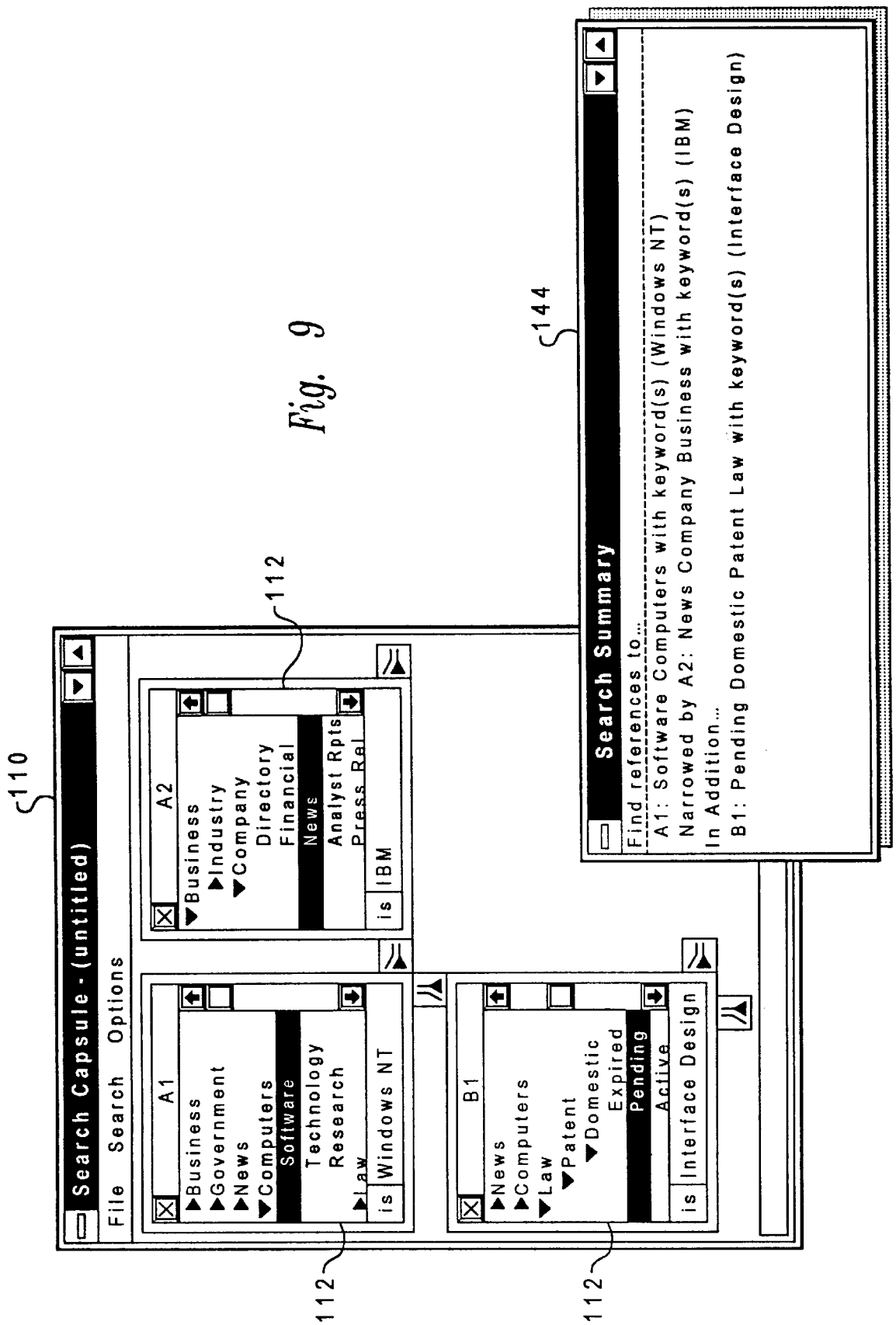

METHOD AND SYSTEM FOR PERFORMING NON-BOOLEAN SEARCH QUERIES IN A GRAPHICAL USER INTERFACE

BACKGROUND OF THE INVENTION

1. Technical Field

The present invention relates, generally, to a data processing system using a graphical interface and, more particularly, to a graphical user interface by which a user may perform query searches without the need to invoke boolean operators. More specifically still, the present invention relates to a graphical user interface that allows a user to generate complex queries in a non-boolean fashion by interacting with graphical elements.

2. Description of the Related Art

Data processing systems having large data stores are well known in the art. Graphical user interfaces have been provided with these data processing systems to lessen the requirement that the user be "computer literate." Graphical user interfaces allow a user to manipulate data and applications merely by positioning a pointing device, such as a mouse icon, on a desired operation, such as an open application or retrieve file.

In order to perform searches or queries within a system that manages and archives documents, traditional methods for construction such complex information queries typically require an understanding of boolean logic by the end user. A user who does not understand boolean logic typically obtains incorrect or useless results. For example, in such a system that manages and archives documents, there typically exists an interface for searching and retrieving files that match certain user criteria. One might specify a search query retrieve documents that contain references to all APPLES and ORANGES, one may then expect documents that contain references to all APPLES and documents that contain references to ORANGES to be retrieved. But, this may not be the case in a boolean framework. In fact, only documents that contain references to APPLES and ORANGES (within each document) may be retrieved. This is because the "AND" operator in boolean logic is vague and confusing.

Although the typical computer literate end user may be familiar with boolean logic, many computer novices are not. Accordingly, what is needed is a method and system that overcome the ambiguities inherent in the boolean logic operators that will be obvious and precise for the end user, regardless of the user's computer literacy.

SUMMARY OF THE INVENTION

It is therefore one object of the present invention to provide a data processing system using a graphical interface.

It is another object of the present invention to provide a graphical user interface by which a user may perform query searches without the need to invoke boolean operators.

It is yet another object of the present invention to provide a graphical user interface allows a user to generate complex queries in a non-boolean fashion by interacting with graphical elements.

The foregoing objects are achieved as is now described. According to the present invention, a data processing system, including a data store and means for archiving files within the data store and a graphical user interface, is disclosed that uses a novel query system. The query system includes a domain scope control field, a narrowing search control funnel, a specific item search field, and a broadening search control funnel. The domain scope control field allows a user to perform a hierarchial search within a plurality of topics available in the domain control field. The search query generates a search cell. The narrowing search control allows a user to narrow the scope of the search cell. The specific item search field allows a user to identify specific key words to be searched within the search cell. The broadening search control allows a user to broaden the scope of the search cell.

The narrowing search field is the functional equivalent to a boolean AND clause while the broadening field is the functional equivalent of the boolean OR clause. A cell replicator that copies search cell is also provided. Further, a negate icon that toggles the specific item search field to a "not" to effect an inverse search is also provided.

The above as well as additional objects, features, and advantages of the present invention will become apparent in the following detailed written description.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction wit the accompanying drawings, wherein:

FIG. 9 illustrates a sample search summary in the user interface.

DETAILED DESCRIPTION OF THE PREFERRED EMBODIMENT

Figure 1:
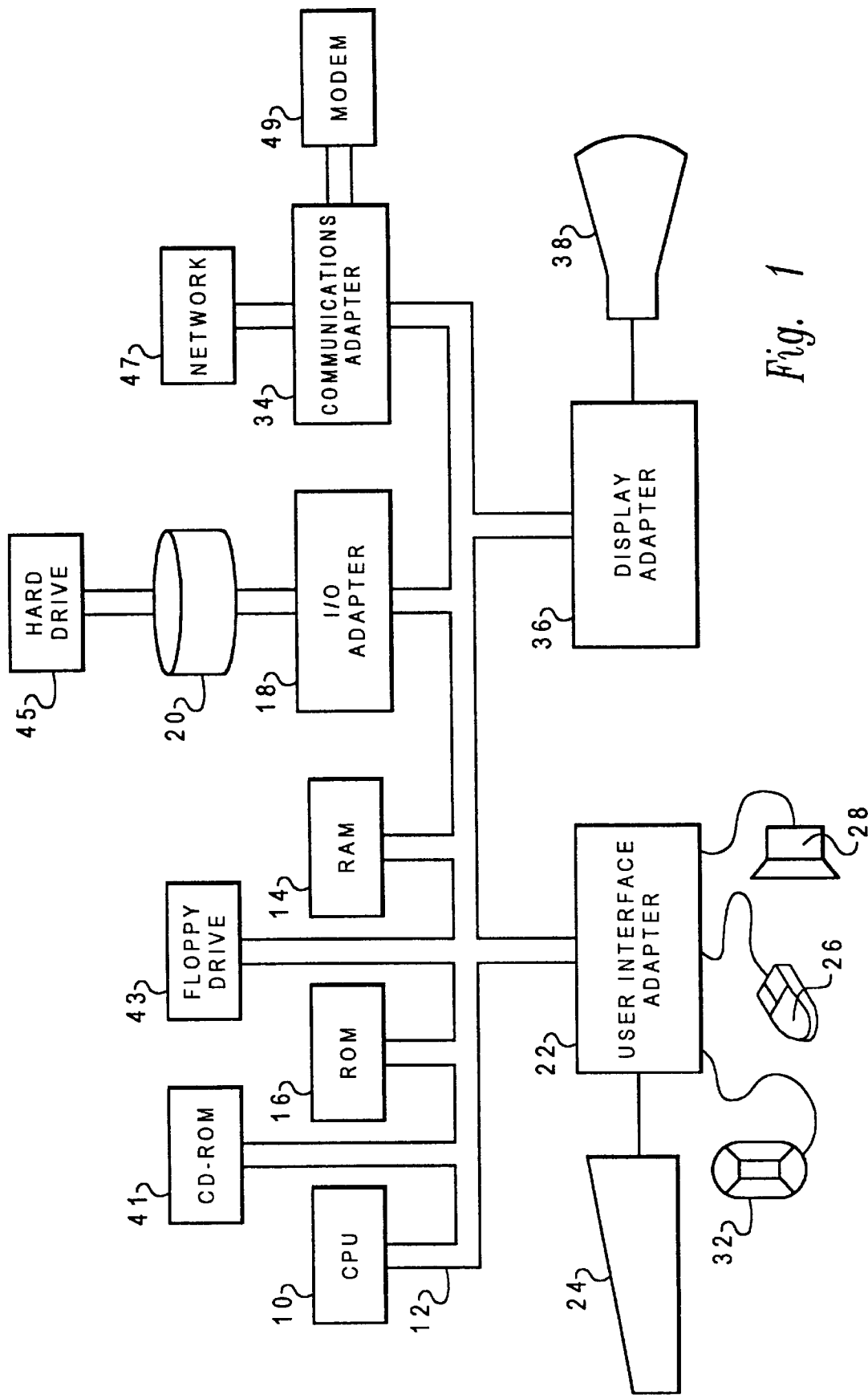
FIG. 1 depicts in accordance with a preferred embodiment of the present invention a representative hardware environment which illustrates a typical hardware configuration of a work station.

The invention is preferably practiced in the context of the operating system resident on an IBM PS/2 computer available from IBM Corporation. A representative hardware environment is depicted in FIG. 1, which illustrates a typical hardware configuration of a workstation in accordance with subject invention having a central processing unit 10 such as a conventional microprocessor, a number of other units interconnected via a system bus 12. The workstation shown in FIG. 1 includes a Random Access Memory (RAM) 14, Read Only Memory (ROM) 16, and I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. Other peripheral device may include non-writable storage media (e.g. read only memory devices within a computer such as ROM 16 or CD-ROM disks 41 readable by a computer I/O attachment), writable storage media (e.g. floppy disks 43 and hard drives 45), or communication media such as network 47 and telephone networks via a modem 49. The workstation has resident there on the OS/2 base operating system and the computer software making up this invention, which is included as a tool kit. Other operating systems may also be used that use a graphical user interface and the invention is not thus limited to OS/2.

Upon the computer system described in FIG. 1, and included in the operating system for running the computer system, a search or query engine is provided that allows an end user to perform query searches in data stores that archive documents, such as articles, graphical images, computer movies, or other types of data files that are archived. The implementation and operation of the query search engine is illustrated in FIG. 2.

Figure 2:
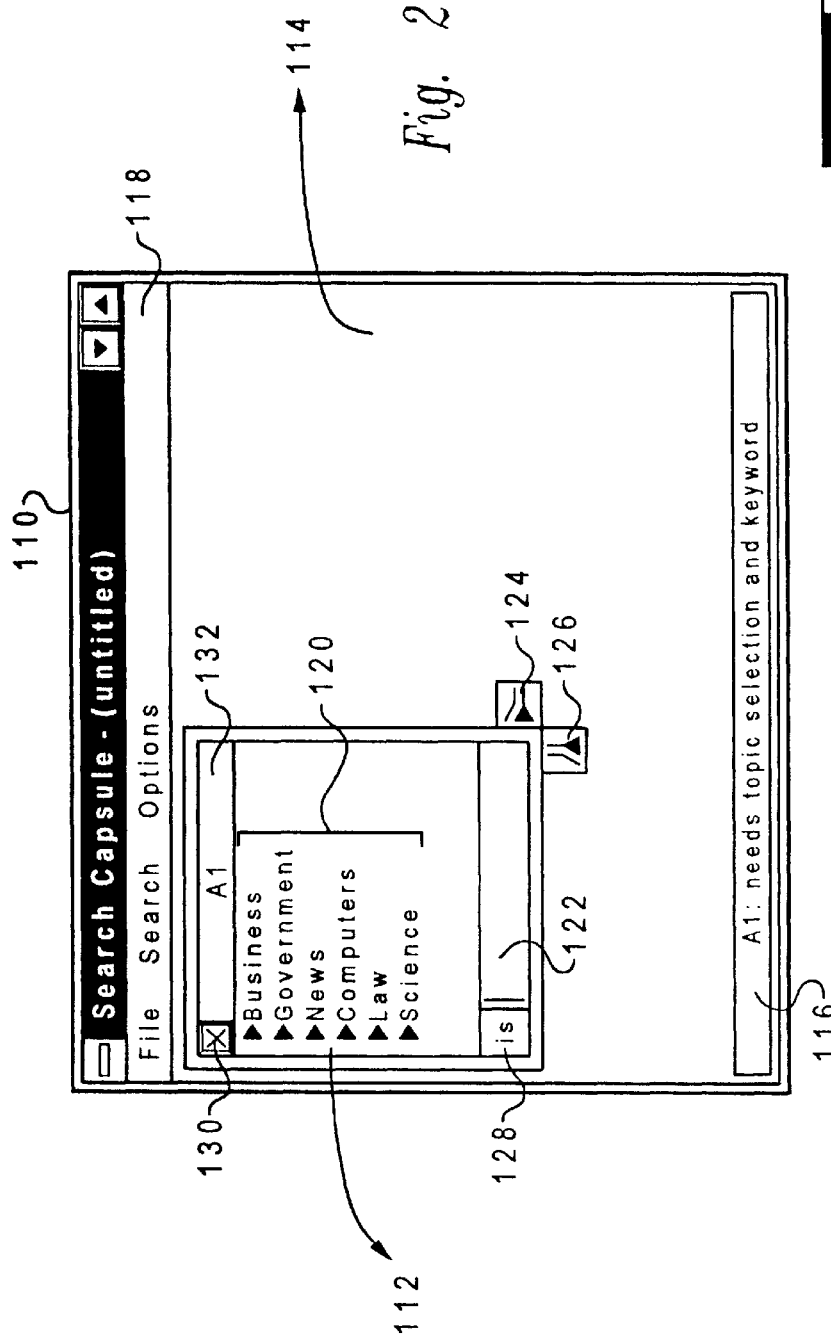
FIG. 2 depicts a graphical user interface image of a search capsule or search cell.
Figure 4:
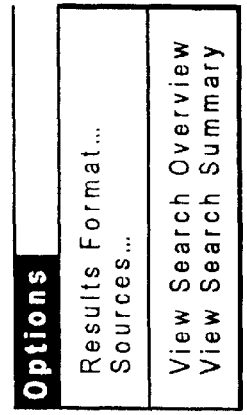
FIG. 4 depicts the options pull-down menu that provides the functions of generating a results format identifying the sources view, search overview, and view search summary.
Figure 3:
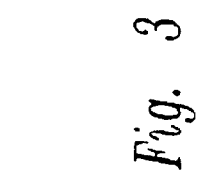
FIG. 3 illustrates the pull-down file menu that allows a user to save the search capsule, add other capsules, or copy the cells from another capsule.

FIG. 2 depicts a graphical user interface image of a search capsule or search cell according to the present invention. Search Capsule 110 further comprises a search Cell 112. Search Capsule 110 further includes a search work place Area 114 and summary Field 116 that provides a summary of the cell 110 that is currently active. It is also mouse sensitive, providing a dynamic description over which the pointer currently points. Selected pull-down Menus 118 are also provided that provide File, Search, and Options tools for the end user. FIG. 3 illustrates the pull-down file menu that allows a user to save the search capsule, add other capsules, or copy the cells from another capsule. FIG. 4 further represents the options pull-down menu that provides the functions of generating a results format identifying the sources view, search overview, and view search summary. The view search overview allows the user to toggle the search overview display illustrated below, while the search summary allows the user to toggle the search summary display also described in greater detail below.

Referring back to FIG. 2, search Cell 112 is comprised of several controls. The first control is the domain scoping control 120, which is used to narrow the domain on which the query is to focus. The user can select any of the general domains or "the domain by clicking on the triangle and exposing its children." Further, a key-word input field 122 is provided that allows a user to insert a key word in the input field. Thus, in the example illustrated in FIG. 2, if "computers" were to be selected and "IBM" entered in the key field, the system then retrieves all references to "IBM" in the context of computer articles.

Figure 5:
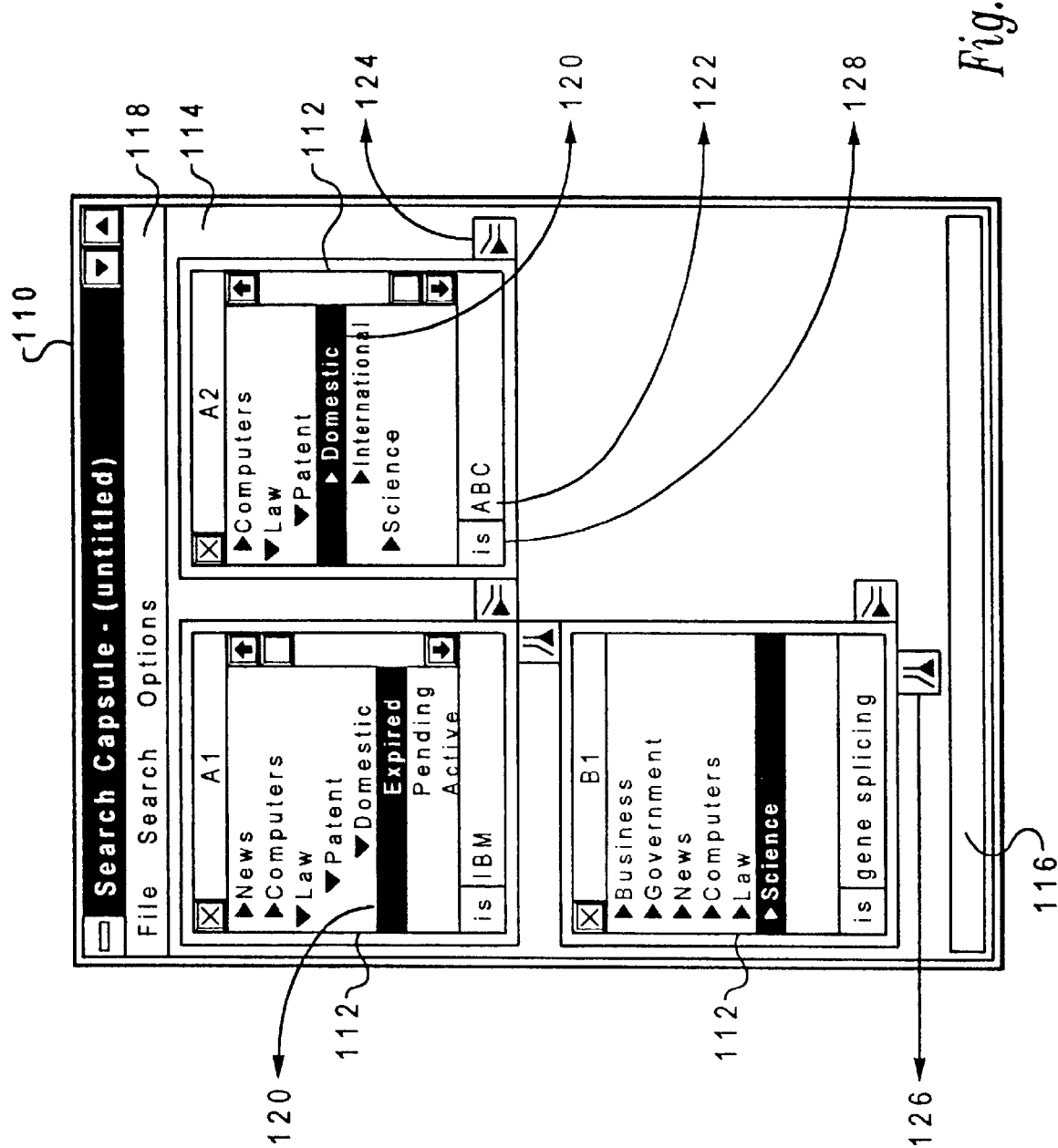
FIG. 5 illustrates a graphical user interface of a search capsule showing the operation of both funnels.

Search Cell 112 further includes a narrowing funnel 124 and a broadening funnel 126. Funnels 124 and 126 are controls that cause other cells to be created, thus altering or enhancing the query. Narrowing Funnel 124 creates a "narrowing" cell. Clicking on funnel 124 exposes another cell whose criteria will cause less items to be returned. FIG. 5 illustrates a graphical user interface of a search capsule showing the operation of both funnels 124 and 126. Cell A1 contains a query that returns references to expired IBM patents. By adding Cell A2, the results of A1 are narrowed because they must also include references to ABC domestic patents.

When a user selects the broadening funnel 126, this operation creates a "broadening" cell B 1. Such cells add more results to the base cell A1. Here, besides the results A1 and A2, documents in the science context that refer to gene splicing as entered in the text field will be returned.

By use of these simple cells, very complex queries may be constructed. Because cells may be nested within each other, pre-built query "capsules" can be reused any time interchanged among users. Since capsules can be imbedded within cells, potential complexity is hidden from the user. Referring back to FIG. 2, search cell 112 further includes a negate icon 128. This icon toggles the key word text field value between "is" and "not." Further, a clear cell control Icon 128 is provided that allows a user to clear the cell in order to begin a new query. Lastly, search Cell 112 includes a cell title control 132 that allows a user to title the cell for subsequent use.

Referring back to FIG. 5, additional features and operations are now described. Domain scoping control 120 allows a user to narrow the focus of an initial search merely by highlighting any level of the hierarchy exposed in the graphical user interface. Further down the hierarchy one goes, the more specific the search becomes. By the same token, the higher one goes the more general the search becomes. The black bar in the A1 cell depicts where the specific search has been selected. In this case, the user has selected the "Law" domain with a subset of "Patents and Domestic Patents" that have expired. For further example, the search Cell A2 also has Law Patents Domestic, but it broader in that it is not limited to merely expired patents.

Key word Field 122 allows the user to enter the actual information that is desired to be found. Wild cards and complex criteria are also allowed here. For example, the user might specify a particular word root and then return any archived files that mention that root in any particular word. Key word modifier 130 allows the user to flip from an "is" to a "not" to effect inverse searches. In this example in the search Cell A2, if the user switched to "not" the search would find all records that do not contain ABC.

Further, in the search capsule of FIG. 5, search Cell B1 currently has the Focus since the border is darker than that of search Cell A2 or A2. At this stage, B1 is at a very general search level that might result in many records being returned.

Figure 6:
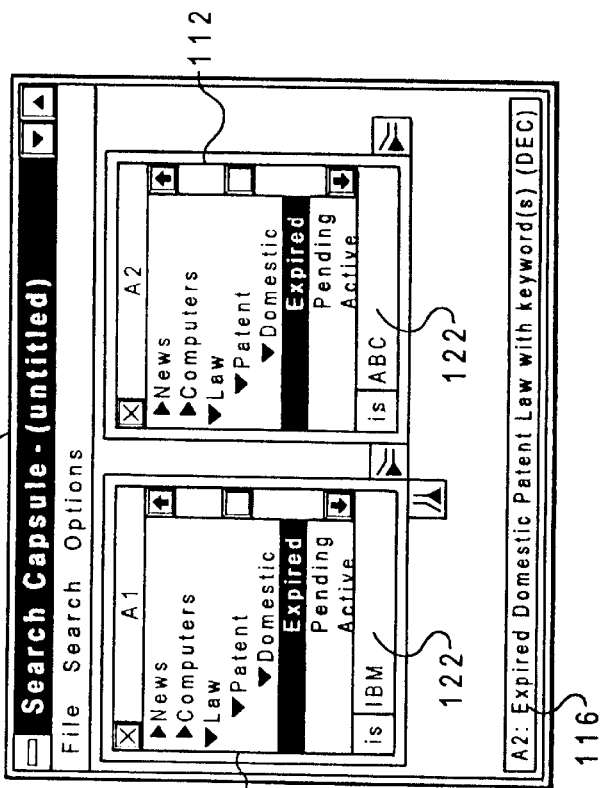
FIGS. 6A and 6B depicts activating either funnel which allows the user to copy the active search cell.

Activating either Funnel 124 or 126 allows the user to copy the active search cell. This operation is illustrated in FIG. 6 (FIG. 6A and 6B). In this example of FIG. 6, the user clicks his mouse icon on the narrowing Funnel 124 or places his mouse pointer on the cell frame and drags search Cell A1 to the right. The user has now made an identical copy of Cell A1. The user is now able to make minor modifications, such as changing the key word, conveniently without changing any other parameters. The results of dragging the file and generating a copy are shown in FIG. 6B. In this example, the second cell is now labeled A2, and the user is now free to change the key word or modify any of the domain scoping controls as previously described. Also during the operation of dragging and dropping the frame to make a copy and then having completed generating the A2 and then modifying the key word search to deck such activity is described below in Field 116.

Figure 7:
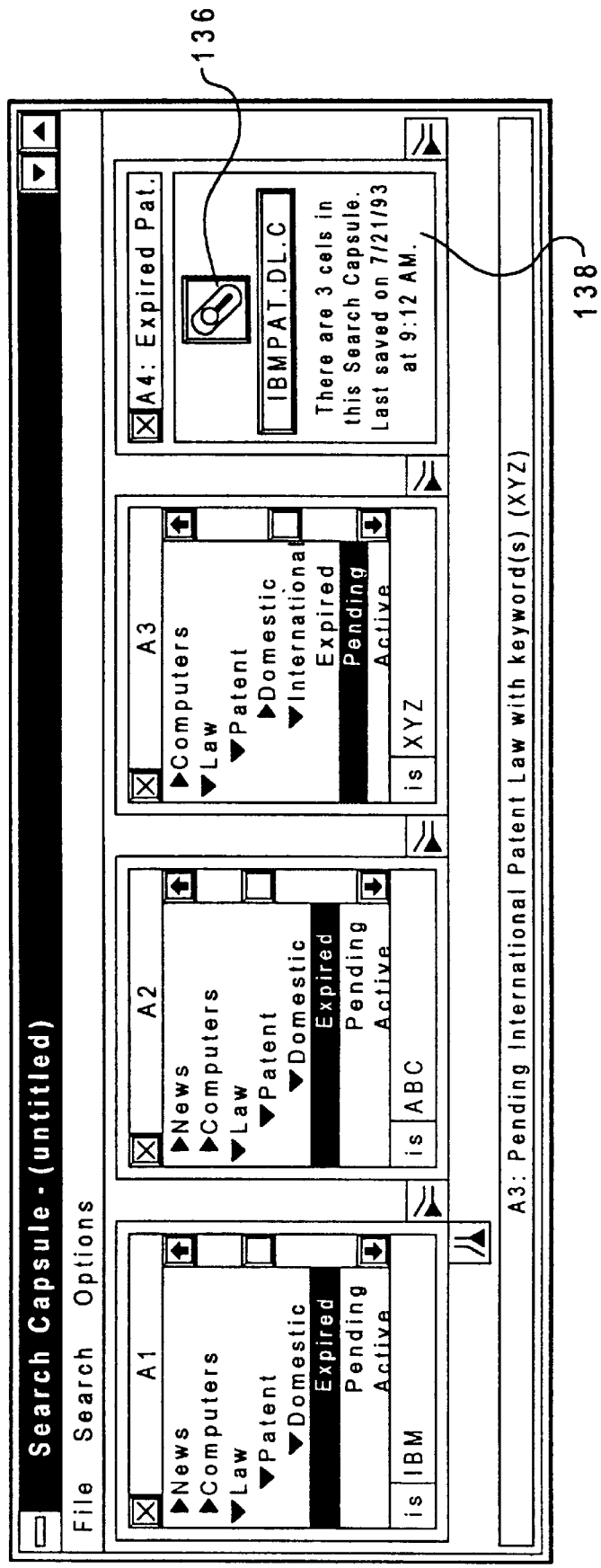
FIG. 7 illustrates a search capsule that has been imbedded in the current capsule.

As previously mentioned above, search capsules may be imbedded in currently active capsules. FIG. 7 illustrates a search capsule that has been imbedded in the current capsule. To edit the contents of the search capsule, the user would double click on the Icon 136. This causes the capsule to be opened to display a window similar to that shown in FIG. 7. The imbedded Capsule 138 always resolve at search execution time, thereby guarantying the latest version of the cells within. Search capsules are designed to be modular, thus allowing sharing among users. They provide the building blocks for elaborate searches. Entire libraries of search capsules can be built and made available to the user community to facilitate search construction. In this example, imbedded Capsule 138 details that there are three cells in this search capsule with the last save occurring on Jul. 21, 1995 at 9:12 a.m. The name of this capsule is "IBM$_{13}$ PAT.DLC."

Figure 8:
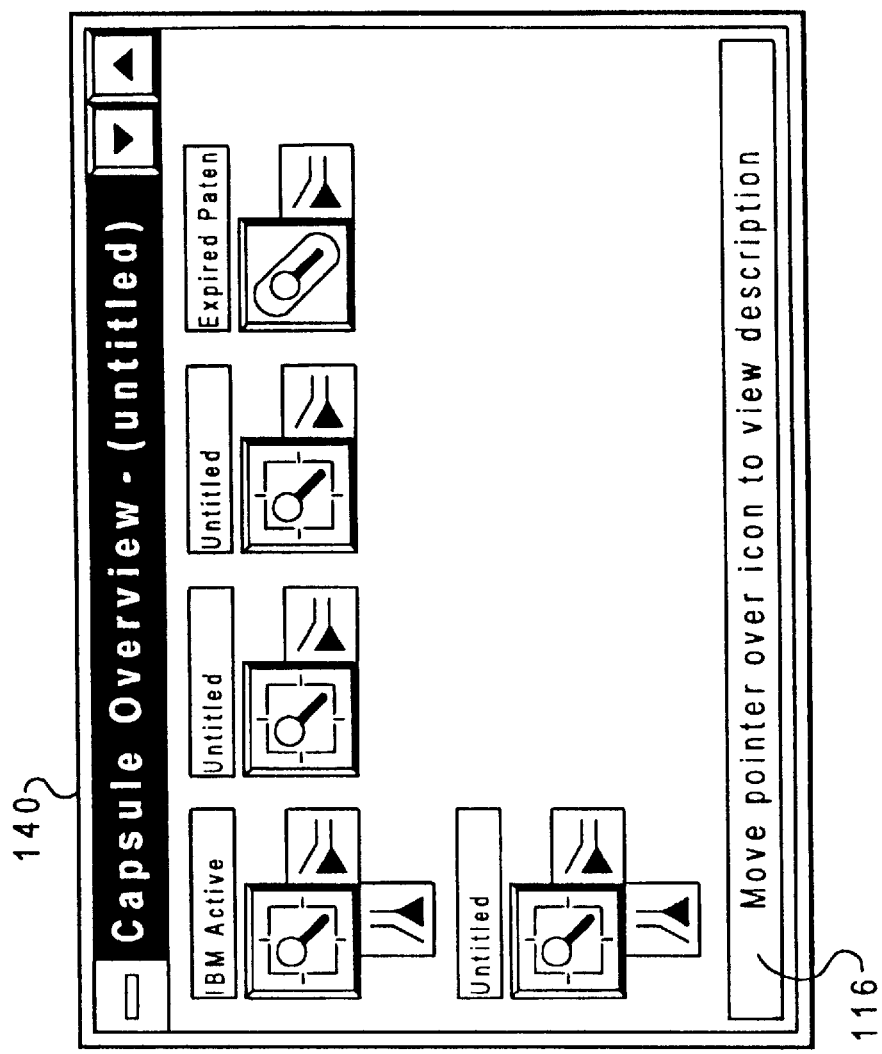
FIG. 8 depicts the query engine according to the present invention further includes an overview capsule.

The query engine according to the present invention further includes an overview Capsule 140 as depicted in FIG. 8. The capsule overview 140 further includes an overview Map 142 that provides a user a birds-eye view of the search presently being constructed. The display is mouse sensitive, therefore, when the user moves the mouse over a an icon, a description of that particular cell "or capsule" to be displayed is provided in Field 116. When a cell or capsule is in focus in the main editing window, it is highlighted in this map, telling the user the user's location.

As previously mentioned, when the user selects the view search summary tool in the options menu, a search summary provided for user's information. A sample search summary is illustrated in the user interface of FIG. 9. In this example, a search summary 144 is provided that is a panel describing the search the user has presently constructed. The information changes dynamically as the user updates the search cells. In this example, a search Cell A1 is a software computer search using the key words windows NT that has been narrowed in Cell A2 for news company business using the key words IBM. An additional search has been performed in search Cell B1 regarding pending domestic patent law using the key words interface design.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms; including, but not limited to: (a) information permanently stored on non-writable storage media (e.g. read only memory devices within a computer such as ROM 16 or CD-ROM disks 41 readable by a computer I/O attachment); (b) information alterably stored on writable storage media (e.g. floppy disks 43 and hard drives 45; or (c) information conveyed to a computer through communication media such as network 47 and telephone networks via a modem 49. It should be understood, therefore, that such media, when carrying computer readable instructions that direct the method functions of the present invention represent alternate embodiments of the present invention.

While the invention has been particularly shown and described with reference to a preferred embodiment, it will be understood by those skilled in the art that various changes in form and detail may be made therein without departing from the spirit and scope of the invention.

We claim:

1. In a data processing system, including a data store and means for archiving files within said data store and a graphical user interface, a query system presented utilizing said graphical user interface comprising:

a graphically displayed search cell for graphically specifying a search query, said search cell capable of being utilized to permit graphical specification of a plurality of parameters of a search;

a domain scope control field graphically displayed within said search cell that allows a user to perform said hierarchical search within a plurality of topics displayable in said domain scope control field, wherein one of said plurality of topics is graphically selected utilizing said search cell as a domain scope of the search;

a graphical narrowing search control indicator that allows a user to narrow a result of said search, said narrowing search control indicator capable of being utilized to generate a second graphically displayed search cell;

a specific item search field that allows a user to identify specific key words to be searched within said one of said plurality of topics; and a graphical broadening search control indicator that allows a user to broaden said result of said search, said broadening search control indicator capable of being utilized to generate a third graphically displayed search cell.

2. The query system according to claim 1 further comprises:

a cell replicator that copies said search cell.

3. The query system according to claim 1 wherein said search cell further comprises:

a negate icon that toggles the specific item search field to a "not Boolean function" to effect an inverse search.

4. The query system according to claim 1 further comprising:

said second search cell being associated with a second search, said second search cell being capable of permitting a graphical specification of a second plurality of parameters of said second search; and said second search cell including a second domain scope control field graphically displayed within said second search cell for permitting a graphical selection utilizing said second search cell of a second of said plurality of topics as a domain scope of said second search.

5. The query system according to claim 4 further comprising said second search generating a second result, said second search narrowing the result of said search by generating a final result which includes only a portion of said result which is also included in said second result.

6. The query system according to claim 5 further comprising:

said third search cell being associated with a third search, said third search cell being capable of permitting a graphical specification of a third plurality of parameters of said third search; and said third search cell including a third domain scope control field graphically displayed within said third search cell for permitting a graphical selection utilizing said third search cell of a third of said plurality of topics as a domain scope of said third search.

7. The query system according to claim 6 further comprising said third search generating a third result, said third search broadening the result of said search by generating a second final result which includes both said result and said third result.

8. A computer program product that can be used by a data processing system, including a data store and means for archiving files within said data store and a graphical user interface, comprising:

computer usable code means for generating a graphically displayed search cell for graphically specifying a search query, said search cell capable of being utilized to permit graphical specification of a plurality of parameters of a search;

computer usable code means for generating a domain scope control field graphically displayed within said search cell that allows a user to perform said hierarchical search within a plurality of topics displayable in said domain scope control field, wherein one of said plurality of topics is graphically selected utilizing said search cell as a domain scope of the search;

computer usable code means for generating a graphical narrowing search control indicator for narrowing a result of said search, said narrowing search control indicator capable of being utilized to generate a second graphically displayed search cell;

computer usable code means for selecting a specific item search that allows a user to enter specific key words to be searched within said one of plurality of topics; and computer usable code means for generating a graphical broadening search control indicator that allows a user to broaden said result of said search, said broadening search control indicator capable of being utilized to generate a third graphically displayed search cell.

9. The computer program product according to claim 8, further comprises:

computer usable code means for replicating a search cell.

10. The computer program products according to claim 6 further comprising:

computer usable code means for negating the specific item search code means to effect an inverse search.

11. The computer program product according to claim 8 further comprising:

said second search cell being associated with a second search, said second search cell being capable of permitting a graphical specification of a second plurality of parameters of said second search; and said second search cell including a second domain scope control field graphically displayed within said second search cell for permitting a graphical selection utilizing said second search cell of a second of said plurality of topics as a domain scope of said second search.

12. The computer program product according to claim 11 further comprising said second search generating a second result, said second search narrowing the result of said search by generating a final result which includes only a portion of said result which is also included in said second result.

13. The computer program product according to claim 12 further comprising:

said third search cell being associated with a third search, said third search cell being capable of permitting a graphical specification of a third plurality of parameters of said third search; and said third search cell including a third domain scope control field graphically displayed within said third search cell for permitting a graphical selection utilizing said third search cell of a third of said plurality of topics as a domain scope of said third search.

14. The computer program product according to claim 13 further comprising said third search generating a third result, said third search broadening the result of said search by generating a second final result which includes both said result and said third result.

* * * * *

UNITED STATES PATENT AND TRADEMARK OFFICE
CERTIFICATE OF CORRECTION

PATENT NO. : 5,842,203
DATED : Nov. 24, 1998
INVENTOR(S) : *D'Elena et al.*

It is certified that error appears in the above-identified patent and that said Letters Patent is hereby corrected as shown below:

At col. 3, line 67, delete "B 1" and insert --B1--.

At col. 5, lines 9 and 10, delete "$IBM_{13}PAT.DLC$" and insert --IBM_PAT.DLC--.

At col. 7, line 15 (Claim 8), insert --said-- after "one of" and before "plurality".

Signed and Sealed this

Tenth Day of August, 1999

Attest:

Q. TODD DICKINSON

*Attesting Officer*  *Acting Commissioner of Patents and Trademarks*